US006762906B1

(12) United States Patent
Wakita et al.

(10) Patent No.: US 6,762,906 B1
(45) Date of Patent: Jul. 13, 2004

(54) DISK DRIVE FOR REMOVABLE DISK CARTRIDGES AND RECEIVABLE INTO A PCMCIA PORT OF A COMPUTER

(75) Inventors: Maki Wakita, Saitama (JP); Takayoshi Hoshiba, Saitama (JP)

(73) Assignees: Iomega Corporation, San Diego, CA (US); Citizen Watch Company, Tokyo (JP)

( * ) Notice: Subject to any disclaimer, the term of this patent is extended or adjusted under 35 U.S.C. 154(b) by 0 days.

(21) Appl. No.: 09/830,747

(22) PCT Filed: Mar. 18, 1999

(86) PCT No.: PCT/US99/05821

§ 371 (c)(1),
(2), (4) Date: Jul. 7, 2001

(87) PCT Pub. No.: WO00/26905

PCT Pub. Date: May 11, 2000

Related U.S. Application Data

(60) Provisional application No. 60/106,352, filed on Oct. 30, 1998.

(51) Int. Cl.[7] ........................... G11B 17/28; G11B 19/20; G11B 33/12
(52) U.S. Cl. ................. 360/97.01; 360/99.01; 360/99.04; 360/99.08; 360/133
(58) Field of Search ..................... 360/97.01, 98.01, 360/99.01, 98.07, 99.04, 99.08

(56) References Cited

U.S. PATENT DOCUMENTS

| | | | |
|---|---|---|---|
| 3,815,150 A | 6/1974 | Stoddard et al. | 346/137 |
| 4,607,301 A | 8/1986 | Iizuka | 360/93 |
| 4,930,029 A | 5/1990 | Morita | 360/97.01 |
| 4,937,771 A | 6/1990 | Rumps, Jr. et al. | 364/708 |
| 5,025,336 A | 6/1991 | Morehouse et al. | 360/97.02 |
| 5,109,310 A | 4/1992 | Ohkjita et al. | 360/106 |
| 5,212,606 A | 5/1993 | Park | 360/99.02 |
| 5,229,919 A | 7/1993 | Chen | 361/391 |
| 5,243,495 A | 9/1993 | Read et al. | 361/685 |
| 5,270,887 A | 12/1993 | Edwards et al. | 360/97.03 |
| 5,329,412 A | 7/1994 | Stefansky | 360/97.01 |
| 5,457,588 A | 10/1995 | Hattori et al. | 360/99.08 |
| 5,461,523 A * | 10/1995 | Hoshi | 360/99.12 |
| 5,481,420 A | 1/1996 | Cardona et al. | 360/99.06 |
| 5,502,604 A | 3/1996 | Furay | 360/97.01 |
| 5,532,889 A | 7/1996 | Stefansky et al. | 360/97.01 |
| 5,596,461 A | 1/1997 | Stefansky | 360/97.01 |
| 5,600,513 A * | 2/1997 | Nakata et al. | 360/99.08 |
| 5,602,697 A | 2/1997 | Jeong et al. | 360/97.02 |
| 5,648,882 A | 7/1997 | Tangi et al. | 360/99.06 |
| 5,689,388 A | 11/1997 | Oka et al. | 360/99.12 |
| 5,701,216 A | 12/1997 | Yamamoto et al. | 360/99.02 |

(List continued on next page.)

FOREIGN PATENT DOCUMENTS

| | | | |
|---|---|---|---|
| JP | 5-189947 | | 7/1993 |
| JP | 10-199219 A | * | 7/1998 |
| JP | 11-162098 A | * | 6/1999 |
| JP | 2002-162884 A | * | 6/2002 |

*Primary Examiner*—Jefferson Evans
(74) *Attorney, Agent, or Firm*—Woodcock Washburn LLP

(57) ABSTRACT

A disk drive device includes a protective case having an upper case and a lower case. The disk drive device has a form such that the disk drive device can be inserted into and removed from a PCMCIA port of a computer. The disk drive device has an output connector located at one end of the protective case so that the input/output connector can connect with a PCMCIA connector of the computer when the disk drive device is inserted in the PCMCIA port. Information from the computer can thus be stored on the disk drive device, or information from the disk drive device can be read into the computer.

22 Claims, 4 Drawing Sheets

U.S. PATENT DOCUMENTS

| | | | |
|---|---|---|---|
| 5,717,542 A | 2/1998 | Yokota et al. | 360/99.06 |
| 5,815,479 A | 9/1998 | Lee | 369/75.1 |
| 5,825,586 A | 10/1998 | Teshima | 360/99.04 |
| 5,864,441 A | 1/1999 | Coffey et al. | 360/97.01 |
| 5,870,248 A | 2/1999 | Akutsu et al. | 360/99.04 |
| 5,940,245 A | 8/1999 | Sasaki et al. | 360/99.06 |
| 5,951,310 A | 9/1999 | Seto et al. | 439/142 |
| 5,959,804 A * | 9/1999 | Hashimoto et al. | 360/99.06 |
| 5,969,907 A * | 10/1999 | Yagi et al. | 360/97.01 |
| 5,982,578 A | 11/1999 | Forbord et al. | 360/97.01 |
| 6,005,755 A | 12/1999 | Muse et al. | 360/133 |
| 6,011,670 A | 1/2000 | Balsley, Jr. et al. | 360/97.01 |
| 6,031,686 A | 2/2000 | Konno et al. | 360/99.01 |
| 6,034,837 A | 3/2000 | Purkett | 360/78 |
| 6,034,840 A | 3/2000 | Yamamoto et al. | 360/97.01 |
| 6,034,841 A | 3/2000 | Albrecht et al. | 360/97.01 |
| 6,064,568 A | 5/2000 | Schnitt | 361/685 |
| 6,094,324 A | 7/2000 | Komatsu et al. | 360/99.01 |
| 6,147,837 A * | 11/2000 | Schick et al. | 360/133 |
| 6,278,574 B1 * | 8/2001 | Wakita et al. | 360/99.01 |
| 6,452,741 B1 * | 9/2002 | Mukaijima et al. | 360/99.06 |
| 6,510,026 B2 * | 1/2003 | Hashimoto et al. | 360/133 |
| 6,525,900 B2 * | 2/2003 | Hamatsu et al. | 360/99.01 |
| 6,552,869 B1 * | 4/2003 | Takahashi et al. | 360/97.01 |

\* cited by examiner

DISK DRIVE FOR REMOVABLE DISK CARTRIDGES AND RECEIVABLE INTO A PCMCIA PORT OF A COMPUTER

This application claims the benefit of Provisional application No. 60/106,352, filed Oct. 30, 1998.

BACKGROUND OF THE INVENTION

This Application is a 371 of PCT/US99/05821 filed Mar. 18, 1999, which claims priority to Provisional Application No. 60/106,352 filed Oct. 30, 1998.

This invention is directed to a disk drive device; more specifically, it is directed to a disk drive device which has the characteristic that data can be sent and received to and from a computer through a PCMCIA port.

Various types of disk drive devices that read and write information on a rotating disk medium have been developed and used for some time as computer data storage devices. Widely used magnetic disk drive devices are generally available in two broad categories—removable and fixed. In particular, removable cartridge disk drives read and write information magnetically on a disk that is enclosed in a removable protective case. By contrast, fixed disk drives read and write information magnetically on a fixed disk that is permanently fixed in the data storage device.

Fixed disk drives are used as the principal data storage devices of computers, since they typically have data transmission speeds and storage capacities that are several orders of magnitude greater than removable disk drives. Obviously however, fixed disk drives have the drawback, as compared with removable disk drives, that the disk cannot be easily moved to another computer. As a result, it is ordinarily desirable to provide computers with both a removable disk drive along with a fixed disk drive and most desktop computers have both.

In recent years, however, mobile computers of very small sizes, such as handheld, notebook and lap-top computers, have become widely used. Because space in these computers is a premium, removable cartridge disk drives are attached externally or not at all. Furthermore, in such small computers, external removable cartridge drives are very inconvenient for mobile use. Hence, many of these types of computers do not have disk drives, but rather use IC card based storage media via a PCMCIA port on the computer. However, since IC cards use semiconductor memories, storage capacities are small, and costs are high. These drawbacks have made it difficult for such computers to use programs and data that have large storage requirements.

Therefore, there is a need to provide a disk drive device that is portable and that can be easily attached to and detached from computers in the manner of as IC card.

SUMMARY OF THE INVENTION

In order to meet the aforementioned need, this invention provides a disk drive device of the type that accepts a removable disk cartridge. The disk drive device comprises a spindle motor for rotating, a disk medium within the disk cartridge; a head arm; a read/write head coupled to the head arm for writing and reading information on the disk medium, a head moving means, which operates the head arm; and a control circuit board on which electronic parts are mounted; a protective case which is formed from an upper case and a lower case, the protective case having a form such that it can be inserted into and removed from the PCMCIA port of a computer; and an input/output connector placed on one end of the protective case in order to connect it with a PCMCIA connector when it is inserted into the aforementioned PCMCIA board. In the disk drive device, the spindle motor is coupled to the protective case. Preferably, the bearings of the spindle motor are also coupled to the protective case.

The protective case is preferably formed from a sheet material, preferably by pressing. An attachment hole is placed in the bottom surface of the protective case for attachment of the bearings. To that end, projecting parts with a length almost equal to the thickness of the protective case are formed in the bearings, and the projecting part is inserted into the attachment hole in order to fix the bearings to the protective case. The attachment hole may have a flange attached to the bottom surface of the protective case around the attachment hole. Preferably, the flange is formed by burring the protective case.

The bearings are preferably formed from an oil-containing sintered alloy. Moreover, the bearings are preferably fixed to the protective case by inserting them into the attachment hole under pressure.

BRIEF DESCRIPTION OF THE DRAWINGS

The foregoing summary, as well as the following detailed description of the preferred embodiments, are better understood when they are read in conjunction with the appended drawings. The drawings illustrate preferred embodiments of the invention to illustrate aspects of the invention. However, the invention should not be considered to be limited to the specific embodiments that are illustrated and disclosed. In the drawings.

DETAILED DESCRIPTION OF PREFERRED EMBODIMENTS

The invention provides a removable cartridge disk drive for use in a PCMCIA form factor. Throughout the description, the invention is described in connection with a removable media disk drive, and the drive is shown having a rotary actuator. Moreover, a disk cartridge is shown with particular dimensions and a particular shape. However, the particular disk drive and cartridge shown only illustrate the operation of the present invention and are not intended as limitations. The invention is equally applicable to other disk drives including linear actuator disk drives and removable media disk drives that accept differently sized and shaped cartridges. Accordingly, the invention should not be limited to the particular drive or cartridge embodiment shown as the invention contemplates the application to other drive and cartridge types and configurations.

Figure 1:
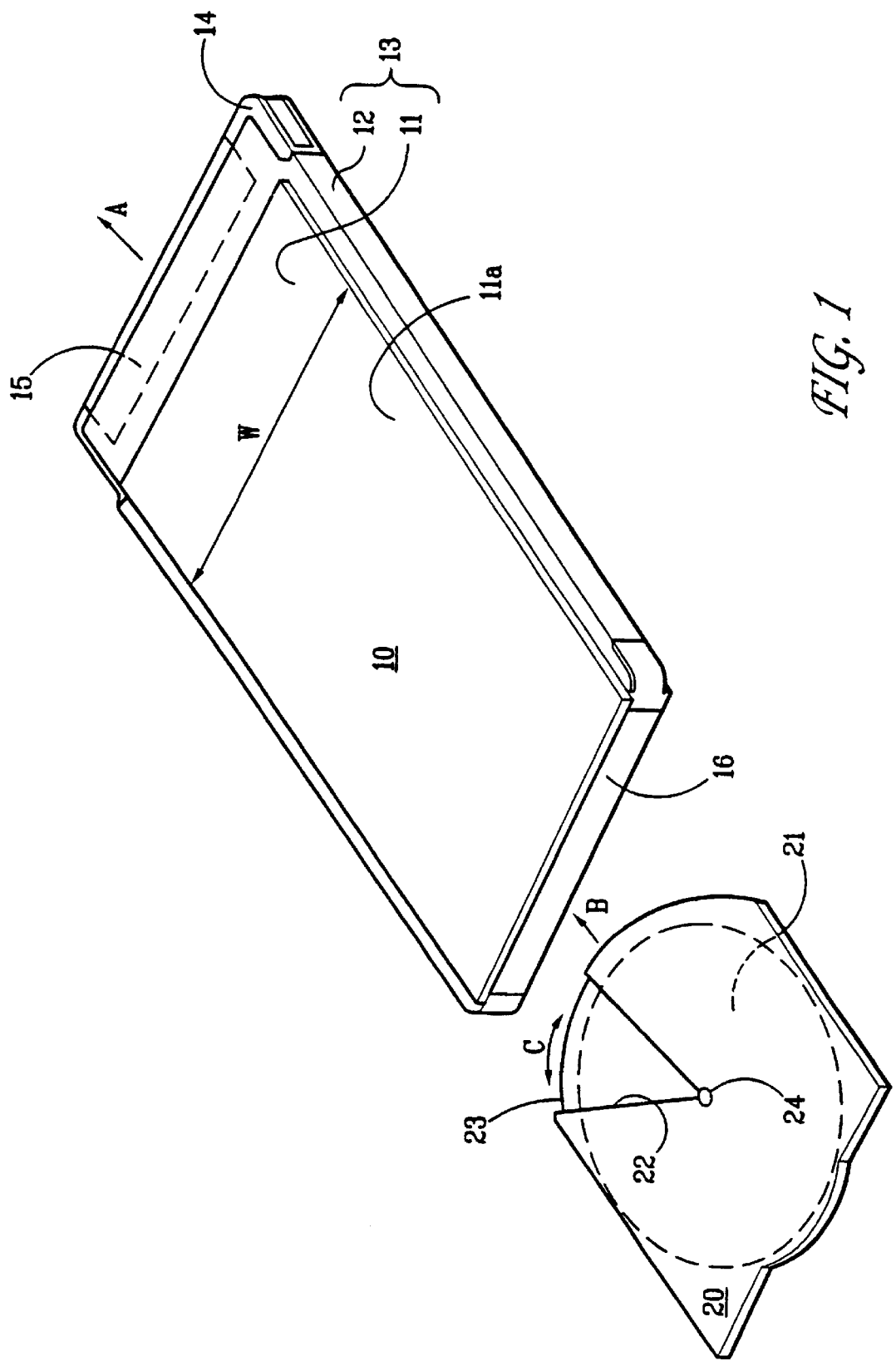
FIG. 1 is a perspective view of a disk drive device and a disk cartridge of this invention.

FIG. 1 is a perspective drawing of a disk drive device 10 and a disk cartridge 20. Disk drive device 10 has a protective case 13, consisting of an upper case 11 and a lower case 12, which form an interior space for accepting disk cartridge 20. Upper case 11 and lower case 12 are formed, preferably by pressing or stamping, from sheet material, preferably metal material. Lower case 12 has a bottom surface and side surfaces, and upper case 11 is formed so that it covers the top of lower case 12.

Upper case 11 has a raised surface 11a, which projects upward across a width W of the upper case 11. Width W of this raised surface 11a is between about 48 mm and 51 mm. Furthermore, lower case 12 also has a raised surface (not shown) similar to raised surface 11a of upper case 11. Here, however, the raised surface projects downward. Together the raised surfaces in upper and lower cases 11 and 12 form an interior space in the protective case 13. Accordingly, space is available within case 13 to accommodate a disk cartridge 20 as well as a disk drive mechanism and electronics.

Figure 2:
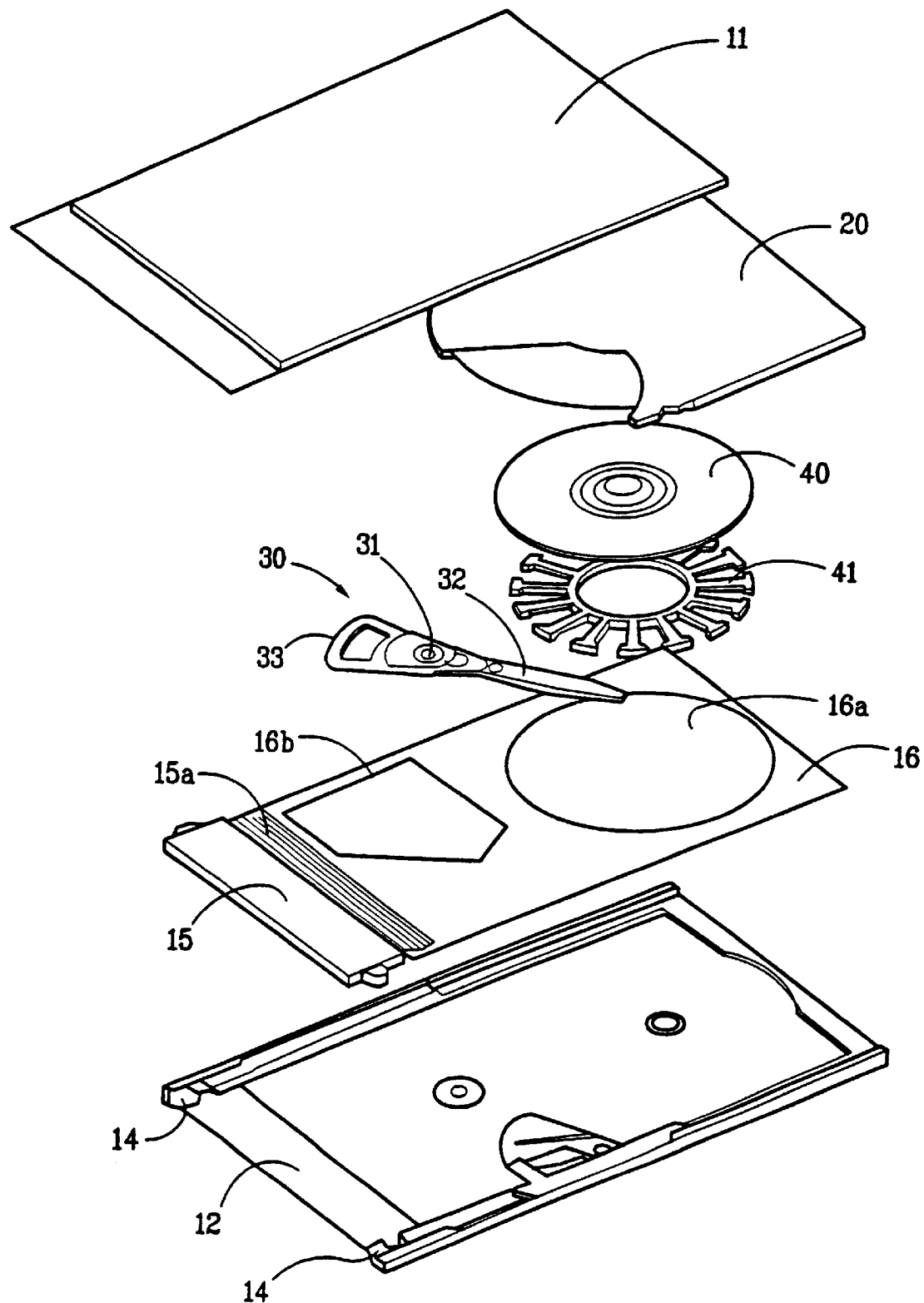
FIG. 2 is an exploded perspective view of the disk drive device of FIG. 1.

A plastic frame 14 is placed on the left and right sides of the protective case 13 such that it is sandwiched between upper and lower cases 11 and 12 (see also FIG. 2). Preferably, plastic frame 14 is molded to become integrated with the lower case 12 such as by outsert molding. Moreover, the plastic frame 14 is directly exposed at the four corners of the protective case 13 and protects the edges of the upper and lower cases 11 and 12 from impacts and the like.

A connector 15 (shown in phantom) is provided in one end of protective case 13. The external dimensions of the protective case 13 are in a form which conforms to the PCMCIA Type II standard. According the standard, the form factor should conform to a length of about 85.6 mm, a width of about 54 mm, and a thickness of about 5 mm. By conforming to this standard, drive device 10 can be inserted into a PCMCIA port, such as the type commonly found in computers (not shown). Furthermore, when disk drive device 10 is inserted into a PCMCIA port of a computer in the direction shown by the arrow A, connector 15 connects to a corresponding connector within the PCMCIA port such that current source and electrical signals can be transmitted and received between disk drive device 10 and the computer.

A disk opening 16 for accepting disk cartridge 20 is formed in the other end of the protective case 13 from the connector 15.

Disk cartridge 20 comprises an outer shell in which a flexible disk 21 is rotatably disposed. A disk access opening 22 is formed in a front portion of disk cartridge 20 to provide access to flexible disk 21. A shutter 23 is rotatably disposed in cartridge 20 to selectively cover and expose disk access opening 22. Shutter 23 rotates in a circumferential direction (arrow C) with the center of rotation 24 proximate the center of flexible disk 21. Disk cartridge 20 is inserted into disk drive device 10 through the disk opening 16. During insertion, shutter 23 is opened by a shutter opening and closing mechanism, not shown in the drawing, exposing flexible disk 21 for access by a pair of read/write heads, discussed in further detail below.

FIG. 2 illustrates the internal structure of the disk drive device 10. A control circuit board 16, containing the disk drive electronics, is firmly adhered to lower case 12. Connector 15 is fixed to the control circuit board 16 by conventional means such as soldering a lead terminal 15a of connector 15 to circuit board 16. Two openings 16a, 16b are formed in control circuit board 16. Opening 16a is formed to provide access to the lower case 12 for attachment of a spindle motor, which comprises a rotor 40 and a stator coil 41. Similarly, opening 16b is formed in order to provide access to lower case 12 for attachment of head arm assembly 30. Head arm assembly 30 comprises a rotating shaft 31, two head arms 32, and a voice coil 33. A magnetic head (not shown) is fixed to the end of each of the two head arms 32. Moreover, voice coil 33 is formed on head assembly 30 opposite the head arms 32. In combination with a magnet (not shown) voice coil 33 constitutes a voice coil motor for rotating the head arm assembly over the flexible disk 21 during drive 10 operation.

When the disk cartridge 20 is inserted into disk drive device 10, flexible disk 21 couples with a chuck platform 44 which is provided on rotor 40 by the chucking mechanism explained below, and accordingly rotates together with the rotation of rotor 40. Head arm assembly 30 is retracts during insertion or ejection of disk cartridge 20. Head arm assembly 30 loads the read/write heads (not shown) after cartridge 10 is inserted and flexible disk 21 is rotating at an operational speed.

Figure 3:
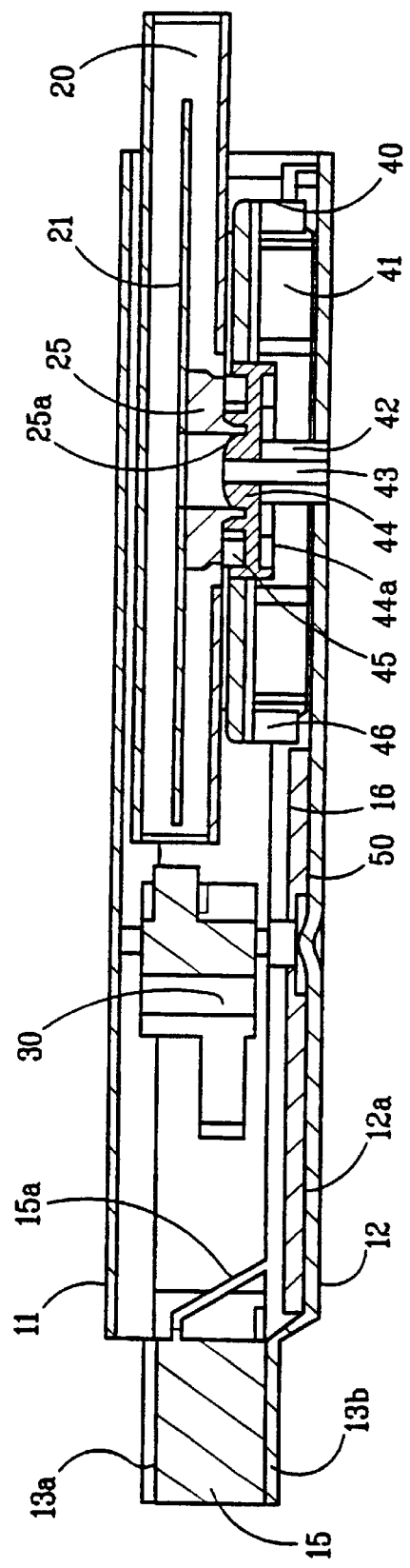
FIG. 3 is a cross-sectional view of the disk drive device of FIG. 1 with a cartridge mounted therein.

FIG. 3 illustrates the various components that are attached to lower case 12. In the exemplary drive shown in FIG. 3, the components are primarily attached to the lower case 12. Accordingly, the material thickness of the lower case 12 is preferably greater than that of the upper case 11. However, the material thickness of the upper and lower case is about 0.2 mm.

A chuck platform 44 is fixed to the top center of the rotor 40. A circular rotor magnet 46 is coupled to the inside side walls of rotor 40. The center of chuck platform 44 is center about the center of spindle 43. Rotor 40, chuck platform 44, and spindle 43 all rotate together as one unit. A stator coil 41 is arranged on the bottom surface 12a of the lower case 12 and opposite rotor magnet 46. Spindle 43 is fixed to the bottom surface 12a of lower case 12 through a bearing 42, so that spindle 43 is free to rotate.

A metal hub 25 is fixed to the center of flexible disk 21, which is contained in disk cartridge 20. A ring-shaped projection 25a is formed in the center of the hub 25 and such that it aligns concentrically with chuck platform 44. A ring shaped concave groove 44a is defined in the top surface of chuck platform 44. A chucking magnet 45 is disposed on the chuck platform to magnetically couple the chuck platform with hub 25. Furthermore, when disk cartridge 20 is inserted into the disk drive device 10, ring shaped projection 25a engages with the ring-shaped concave groove 44a, and as a result, flexible disk 21 is positioned concentrically with spindle 23. Positioning is performed in the circumferential direction by the magnetic attraction of the hub 25 by the chucking magnet 45 and the alignment of projection 25a with groove 44a.

Control circuit board 16 is adhered to the bottom surface of lower case 12 through an extremely thin insulating film. Upper case flange 13a and lower case flange 13b are formed on the ends of the upper and lower cases 11 and 12. Connector 15 is sandwiched between flanges 13a, 13b. Upper and lower case flanges 13a and 13b are, respectively, on a lower level than the top surface of upper case 11 and a higher level than the bottom surface of the lower case 12. Control circuit board 16 is contained in the lower level of lower case 13. As noted above, connector 15 is connected to circuit board 16 via lead terminal 15a.

Figure 4:
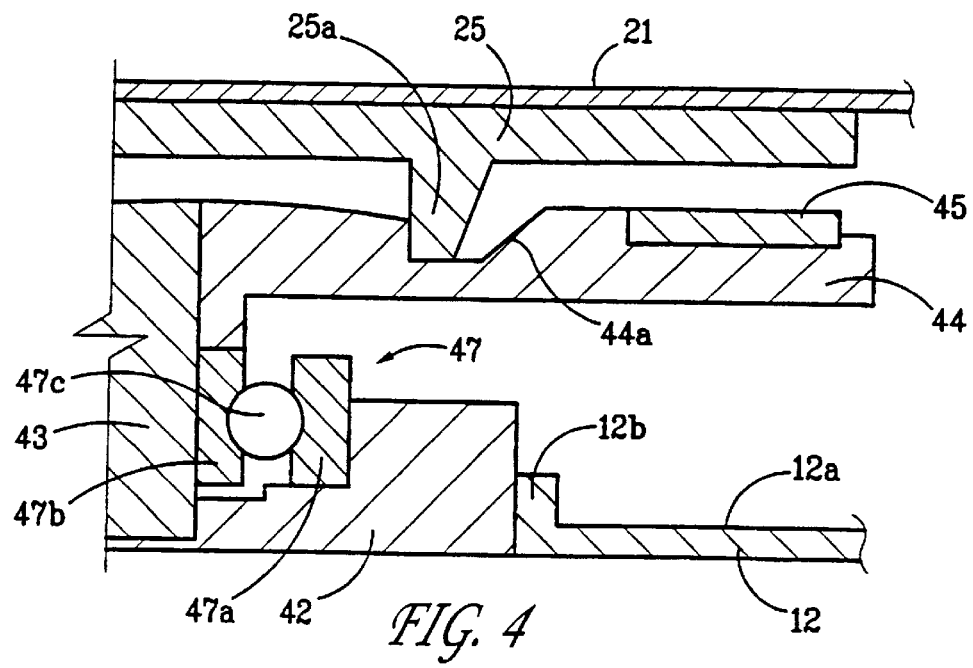
FIG. 4 is a cross-sectional view of an embodiment of a spindle for use in the disk drive device of FIG. 1.
Figure 5:
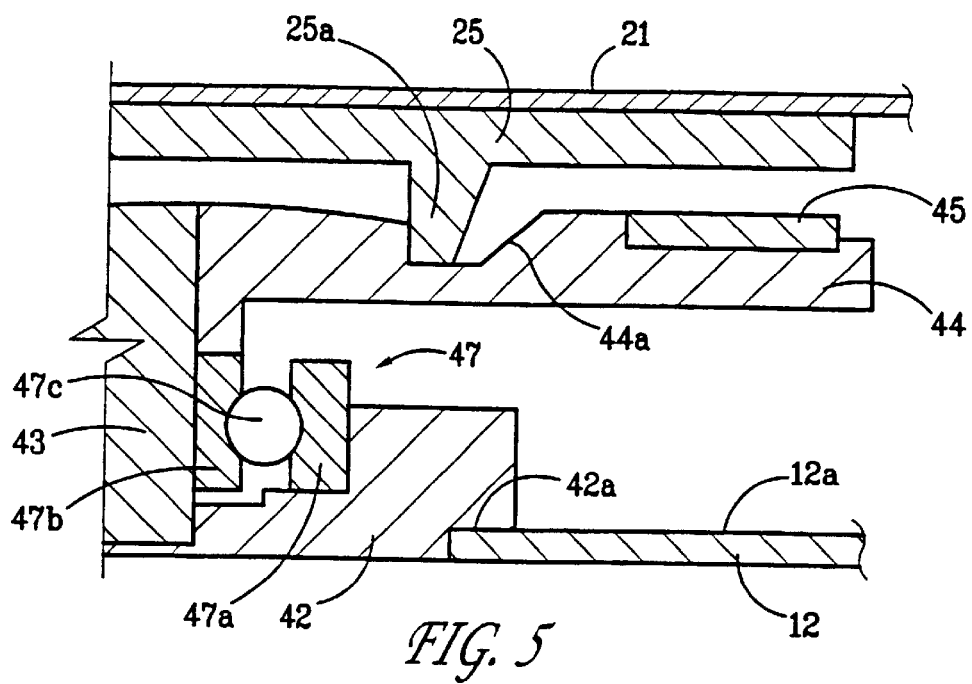
FIG. 5 is a cross-sectional view of a second embodiment of a spindle for use in the disk drive device of FIG. 1.

FIGS. 4 and 5 illustrate the attachment of spindle 43 within disk drive device 10. FIG. 4 shows a first embodiment of the attachment mechanism of spindle 43, and FIG. 5 shows a second embodiment of the attachment mechanism of spindle 43. Both embodiments are described below.

As shown in FIG. 4, a flange 12b is formed on the lower case 12. Preferably the flange is formed by burring. A bushing 42, which is preferably formed from an oil-containing sintered metal; is fixed to lower case 12 by pushing it into flange 12b. A ball bearing 47 is fixed between spindle 43 and bushing 42 to allow spindle 43 to freely rotate. Ball bearing 47 comprises an outer liner 47a, an inner liner 47b, and balls 47c. Spindle 43 is held in place by the force exerted in the thrust direction from the inner liner 47b, the balls 47c, and the outer liner 47a, which are held by bushing 42.

FIG. 5 shows a second embodiment of the spindle attachment mechanism. The difference between the attachment mechanism of the spindle 43 in the embodiment shown in FIG. 5 from the embodiment of FIG. 4 is that no flange 12b is formed in lower case 12. Rather, a concave engaging part 42a is formed in bushing 42. Bushing 42 is fixed in place on the lower case 12 by pressing it into an opening formed in lower case 12.

Other variations on the embodiments discussed above are possible. For example, spindle 43 could be fixed, not to lower case 12, but to a separate sub-chassis from the lower case 12 through a bushing. The sub-chassis could then be fixed to the lower case 12. The sub-chassis and lower case 12 could be fixed together by welding.

The above description of preferred embodiments is not intended to impliedly limit the scope of protection of the following claims. Thus, for example, except where they are expressly so limited, the following claims are not limited to applications involving disk drive systems conforming to the PCMCIA standard.

What we claim is:

1. A disk drive device of the type that accepts a removable disk cartridge, said disk drive device comprising:
   a spindle motor for rotating a disk medium within said disk cartridge;
   a head arm movably disposed within said disk drive device;
   a read/write head coupled to said head arm for writing and reading information on the disk medium;
   a control circuit board on which electronic parts are mounted in electronic communication with at least one of said spindle motor and said head arm;
   a protective case which is formed from an upper case and a lower case, the lower case having an opening formed therethrough that receives a portion of the spindle motor, the protective case encasing said spindle motor, said head arm, and said control circuit board; the protective case having a form such that it can be inserted into and removed from a PCMCIA type II port of a computer;
   and an input/output connector placed on one end of the aforementioned protective case in order to connect it with a PCMCIA connector when it is inserted into the aforementioned PCMCIA port, said connector being in electronic communication with said control circuit board.

2. The disk drive device as recited in claim 1, wherein the lower case and the upper case are formed from a sheet material.

3. The disk drive device as recited in claim 2, wherein the thickness of the sheet material forming the lower case is greater than the thickness of the sheet material forming the upper case.

4. The disk drive device as recited in claim 2, wherein the upper case and lower case are formed by pressing said sheet material.

5. The disk drive device as recited in claim 4, wherein at least one of the upper and lower cases is thicker than the other of the upper and lower cases.

6. The disk drive device as recited in claim 5, wherein the thickness of the thicker of the upper and lower cases is approximately 0.2 mm.

7. The disk drive device as recited in claim 1, wherein the spindle motor comprises a spindle and a bearing, the bearing being coupled to the protective case.

8. The disk drive device as recited in claim 7, further comprising a flange coupled to the bottom surface of the lower case, wherein the bearing is held in place by the flange.

9. The disk drive device as recited in claim 8, wherein the bearing comprises an oil-containing sintered alloy.

10. The disk drive device as recited in claim 7, wherein the bearing comprises an oil-containing sintered alloy.

11. The disk drive device as recited in claim 7, wherein the bearing is fixed to the protective case by inserting the bearing onto the attachment hole under pressure.

12. The disk drive device as recited in claim 1, wherein the control circuit board is adhered almost completely to a surface of one of the upper and lower cases.

13. The disk drive device as recited in claim 12, wherein the control circuit board is adhered to a bottom surface of the lower case.

14. The disk drive device in accordance with claim 1, wherein the upper and lower cases have projecting parts which project outward in the thickness direction, and the width dimensions of these projecting parts are in a range of about 48 mm to 51 mm.

15. The disk drive as recited in claim 1, wherein the spindle motor comprises a spindle arm, a ball bearing, and a bushing, the spindle motor being rotatably coupled to the bushing by way of the ball bearing, the bushing being fixedly coupled to the lower case, and at least a portion of the bushing being positioned within the opening formed through the lower case.

16. The disk drive as recited in claim 15, wherein the bushing is fixedly coupled to the lower case at least in part by friction between the bushing and a perimeter of the opening formed through the lower case.

17. The disk drive as recited in claim 15, wherein the lower case has a flange formed thereon and the bushing is fixedly coupled to the lower case at least in part by friction between the bushing and the flange.

18. The disk drive as recited in claim 15, wherein the bushing has a concave engaging portion formed therein for fixedly coupling the bushing to the lower case.

19. A disk drive device of the type that accepts a removable disk cartridge, comprising:
   a spindle motor for rotating a disk medium within said disk cartridge, the spindle motor comprising a rotor shaft and a bearing having a projection;
   a head arm movably disposed within said disk drive device;
   a read/write head coupled to said head arm for writing and reading information on the disk medium;
   a control circuit board on which electronic parts are mounted in electronic communication with at least one of said spindle motor and said head arm;
   a protective case which is formed from an upper case and a lower case, the protective case encasing said spindle motor, said head arm, and said control circuit board; the protective case having a form such that it can be inserted into and removed from a PCMCIA type II port of a computer, the lower case having an attachment hole formed therein, the bearing being coupled to the protective case, the projection of the bearing being inserted in the attachment hole; and
   an input/output connector placed on one end of the aforementioned protective case in order to connect it with a PCMCIA connector when it is inserted into the aforementioned PCMCIA port, said connector being in electronic communication with said control circuit board.

20. The disk drive of claim 19, wherein the bearing comprises an oil-containing sintered alloy.

21. The disk drive of claim 19, wherein the bearing is fixed to the protective case by inserting the bearing into the attachment hole under pressure.

22. A disk drive device of the type that accepts a removable disk cartridge, comprising:

- a spindle motor for rotating a disk medium within said disk cartridge, the spindle motor comprising a rotor shaft and a bearing;
- a head arm movably disposed within said disk drive device;
- a read/write head coupled to said head arm for writing and reading information on the disk medium;
- a control circuit board on which electronic parts are mounted in electronic communication with at least one of said spindle motor and said head arm;
- a protective case which is formed from an upper case and a lower case, the protective case encasing said spindle motor, said head arm, and said control circuit board; the protective case having a form such that it can be inserted into and removed from a PCMCIA type II port of a computer, the bearing being coupled to the protective case, the lower case having a flange coupled thereto for holding the bearing in place, the flange being formed by burring the lower case;
- and an input/output connector placed on one end of the aforementioned protective case in order to connect it with a PCMCIA connector when it is inserted into the aforementioned PCMCIA port, said connector being in electronic communication with said control circuit board.

* * * * *